March 20, 1973 D. S. FRASER ET AL 3,721,181
EGG CUTTER
Filed Oct. 30, 1970
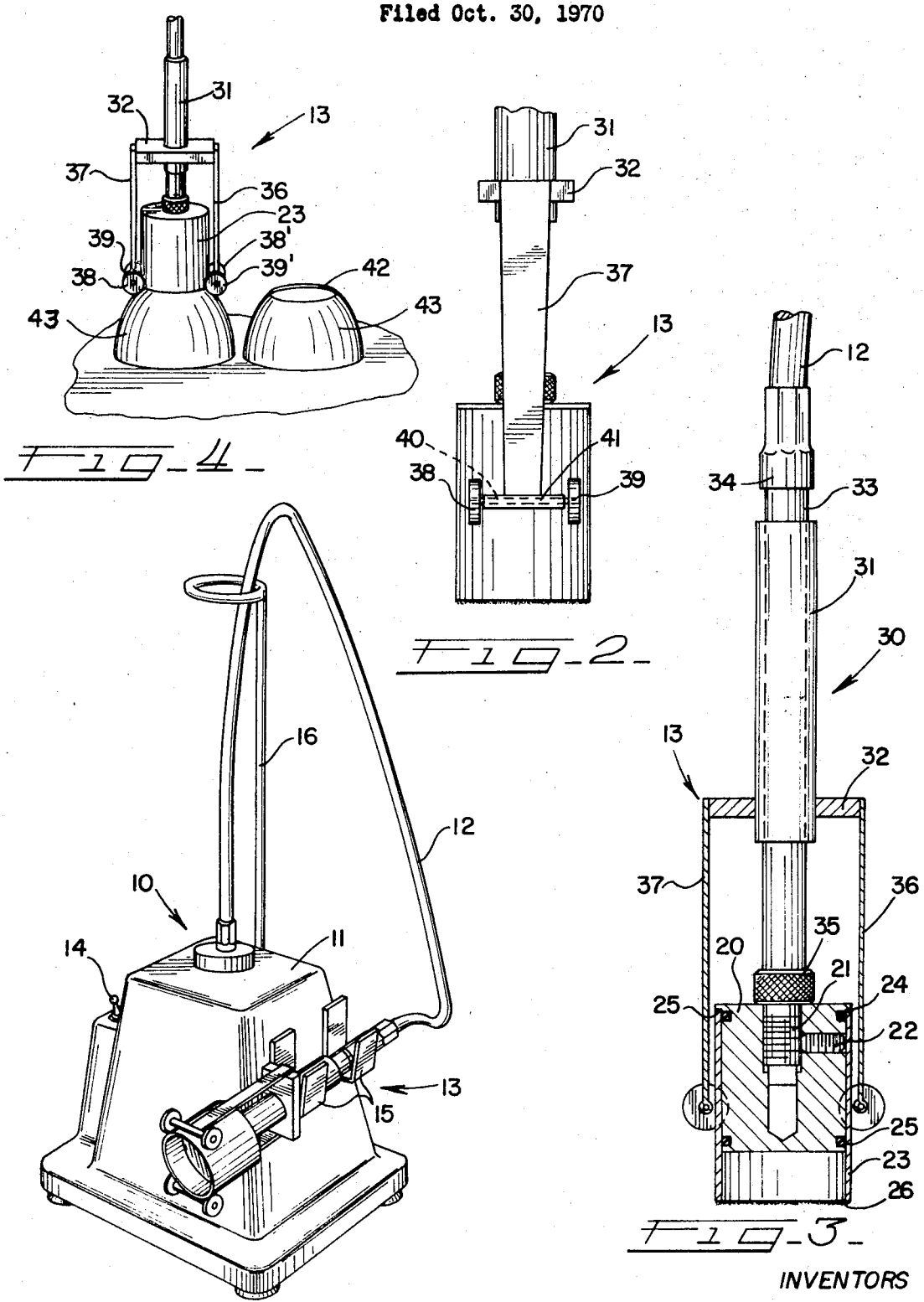
INVENTORS
DOUGLAS S. FRASER
CHARLES E. BENDER
BY Robert E. Wagner
ATT'Y.

United States Patent Office 3,721,181
Patented Mar. 20, 1973

3,721,181
EGG CUTTER
Douglas S. Fraser and Charles E. Bender, New Paltz, N.Y., assignors to Cenco Medical/Health Supply Corporation, Chicago, Ill.
Filed Oct. 30, 1970, Ser. No. 85,386
Int. Cl. A23b 5/00; B25b 3/00; B23q 3/157
U.S. Cl. 99—576                  4 Claims

ABSTRACT OF THE DISCLOSURE

An egg cutter to hold and cut an end of the shell of an egg to permit inspection, sampling or the like. A cylindrical cutter having abrading means on one end is rotated through a flexible shaft. The cylindrical member is on a circle approximating the size of the end of an average egg. Gripping means in the form of wheels to engage the end of the egg assures accurate positioning as the cutter is moved against the egg. The gripping means is retractable to permit the cutter to be used independently.

This invention relates to a new and improved egg cutter for removing an end from an eggshell for inspection without causing damage to the remainder of the eggshell.

In laboratory work with bacteria, viruses and the like, eggs are inoculated and the resultant bacterial growth is subsequently examined in the inoculated egg or the growth removed and viewed under a microscope. In the past, the eggshell was cracked on the end and the broken pieces and membrane removed with tweezers to expose the culture for obtaining a sample for subsequent analysis. This is a somewhat crude technique and haphazard in that portions of the shell may fall into the egg, causing contamination and disturbing the culture. Moreover, the removal of the end of the egg to obtain the culture by this technique is time consuming and slow because of the extraordinary care required to avoid damage to the balance of the eggshell which must remain intact to hold the egg and culture.

The present invention relates to a new and improved egg cutter which permits a perfect circle to be cut on the end of the egg to expose the contents of the egg without damage to the balance of the shell. In most instances, the separated end will remain intact. The egg cutter of the present invention is lightweight, handles quite easily, requires no critical settings or adjustments and may be operated by laboratory assistants with little or no experience.

It is an object of this invention to provide a new and improved egg cutter.

It is a further object of this invention to provide a new and improved egg cutter having a novel gripping means to permit centering of the cutter during the cutting operation, said gripping means being adjustable and retractable.

It is a still further object of this invention to provide a new and improved egg cutter which will be simple to operate, inexpensive to manufacture and permit separation of the cutting parts for cleaning, sterilization and replacement.

Other objects will become apparent to one skilled in the art upon consideration of the drawings and attendant description.

IN THE DRAWINGS

FIG. 1 is a perspective view of the egg cutter of the present invention with the cutting head in the position occupied when not in use;

FIG. 2 is an enlarged side elevational view of the cutting head with the gripping means in the retracted condition;

FIG. 3 is a view similar to FIG. 2 with the cutting head shown in cross section; and FIG. 4 is a perspective view of the cutter in use with portions of the flexible shaft and motor omitted.

Reference to numeral 10 in FIG. 1 indicates an egg cutter consisting of a motor housing and stand 11 containing an electric motor, a flexible shaft 12 and a cutting head assembly indicated generally at 13. The motor stand 11 contatins an electric motor of conventional design which is mechanically coupled to the flexible shaft 12 which is also of known type. A toggle switch 14 is provided on the motor housing to control the operation of the cutter. U-shaped brackets 15 are attached to the side of the motor housing to permit storing of the cutter head when not in use.

The flexible shaft 12 is supported by an upstanding ring member 16 which prevents the shaft from being bent too sharply and assures that it will remain out of the way of the operator during use of the cutter.

The cutting head assembly 13 is best illustrated in FIGS. 2 and 3 and consists of a cylindrical cutter mounting head 20 which is joined by threads 21 or other means to the end of the flexible shaft 12. The flexible shaft 12 is of conventional or known design including an outer non-rotatable housing member housing a flexible shaft member which is rotated by the motor in the motor housing 11. The cylindrical cutter mounting head 20 is attached to the inner shaft and a set screw 22 assures that the cylindrical head 20 will not become detached during high-speed rotation.

A cylindrical sleeve 23 which forms the cutter head is slip-fitted over the cylindrical mounting head 20 and held in place by the friction provided by O-rings 24 and 25 which are located in grooves formed in the head 20. A stop shoulder 25 abuts the upper end of the cylindrical cutter member 23. At the lower end of the cylindrical member 23 is provided an abrading means 26 such as diamond chips, dust or the equivalent bonded to the sides and end of the cylindrical member 23.

An egg gripping and guide means is indicated generally at 30 including a tubular mounting portion 31 having a transverse support 32 attached at the lower end. The tubular mounting portion 31 is received over a non-rotatable portion 33 of the flexible shaft 12 with a friction fit so that it may be moved relative to the member 33 where it remains positioned in the absence of external forces. If desired, a set screw or the like may be utilized to secure the tubular mounting portion in the desired position. The limits of movement are defined by the nut 34 on the upper end of the shaft and the knurled nut 35 on the opposite end of the shaft. The latter functions as a jam nut to assist in holding the cutter head 20 to the shaft. At opposite ends, the transverse support 32 carries a pair of spring arms 36 and 37 which mount a pair of wheels 38 and 39 on opposite ends of a shaft 40 (shown in dotted lines in FIG. 2) positioned in a tubular housing 41 attached to the lower end of the respective spring arms 37. The gripping means or guide is identical on the spring arm 36 and will not be described in detail, however, prime numerals are used to indicate the component corresponding to the component on the spring arm described. The gripping and guide means may be retracted to the position shown in FIG. 3 during periods of nonuse, at which time the cutter head rotates inside the wheels on each of the spring members 36 and 37. The wheels may be formed of low-friction plastic or the equivalent.

As seen in FIG. 4, when an egg 34 is undergoing removal of the end, the gripping means 30 is positioned so that the wheels carried on the spring arms extend slightly below the abrading surface 26. The cutter is energized by turning the toggle switch 14 to the "on" position, causing the cylindrical cutter member 23 to rotate. The wheels 38 and 39 and 38' and 39' are brought into engagement with the shell of the egg 43 with slight downward pressure applied. The wheels will remain positioned over the center of the egg and the downward pressure causes the spring members 36 and 37 to expand slightly while permitting the roller wheels to follow the contour of the shell of the egg 43. The abrading surface 26 on the cylindrical member 23 is brought into engagement with the end of the egg to cut the end of the shell as shown at 42 on the egg 43 which has been cut previously.

The present egg cutter with the novel gripping and guide means permits the egg to be held during the cutting operation. Should it become desirable for the operator to perform the cutting action without the guides, the gripping means may be retracted as shown in FIGS. 2 and 3.

The manner in which the cylindrical cutter member 23 is mounted permits easy removal and replacement should it become worn. Moreover, it permits it to be sterilized and cleaned with minimum effort required for its removal. The stop shoulder 25 on the mounting head 20 locates the cutter head 23 for proper and easy installation.

Upon a consideration of the foregoing, it will become obvious to those skilled in the art that various modifications may be made without departing from the invention embodied herein. Therefore, only such limitations should be imposed as are indicated by the spirit and scope of the appended claims.

We claim:

1. An egg cutter for removing an end from an eggshell without damage to the remainder of the shell, said egg cutter comprising a cylindrical sleeve having an open end approximating the size of an end of an average size egg, abrading means carried on said cylindrical sleeve on and adjacent said open end, means for rotating said cylindrical sleeve having a motor, a flexible shaft having an end thereof connected to said motor and being driven by said motor and having means on an end of said shaft opposite said end connected to said motor to support said cylindrical sleeve for rotation by said shaft on energization of said motor, and egg gripping and guide means to engage said egg and to guide said cylindrical sleeve into engagement with the end of said egg during rotation thereof to bring said abrading means into engagement with the end of said egg.

2. An egg cutter as defined in claim 1 wherein said means on the end of said flexible shaft to mount said cylindrical sleeve comprises a cylindrical head attached to said flexible shaft, said cylindrical head having a shoulder to abut one end of said cylindrical sleeve to assure proper installation and resist forces applied in advancing the cylindrical sleeve, and resilient means interposed between said cylindrical head and said cylindrical sleeve to couple said head and sleeve for rotation while permitting easy separation thereof and removal of said sleeve from said head.

3. The egg cutter as defined in claim 1 wherein said gripping means includes wheel means for engagement on opposite sides of said egg, said wheel means being mounted on spring members positioned on opposite sides of said cylindrical sleeve to center said cylindrical sleeve and abrading means on the end of said egg being cut.

4. The egg cutter of claim 1 wherein said abrading means includes particulate means bonded to said cylindrical sleeve on and adjacent said open end thereof effective to delicately abrade and cut said eggshell, without damaging the membrane of the egg, when brought into engagement therewith during rotation of said cylindrical sleeve.

References Cited
UNITED STATES PATENTS

| | | | |
|---|---|---|---|
| 2,798,521 | 7/1957 | Borque | 146—2 B |
| 3,090,413 | 5/1963 | Rossi | 146—2 B |
| 1,648,979 | 11/1927 | Bessette | 146—2 B |
| 1,306,969 | 6/1919 | Messersmith | 269—289 MR |
| 2,557,202 | 6/1951 | Raymond | 269—289 MR |
| 2,758,706 | 8/1956 | Quinlan | 269—289 MR |
| 2,945,523 | 7/1960 | Jenkins | 269—289 MR |

WAYNE A. MORSE, JR., Primary Examiner

U.S. Cl. X.R.

269—2, 288, 289 MR